May 22, 1962 R. N. GHOSE 3,036,265
GEOPHYSICAL METHOD AND APPARATUS
Filed Jan. 19, 1960
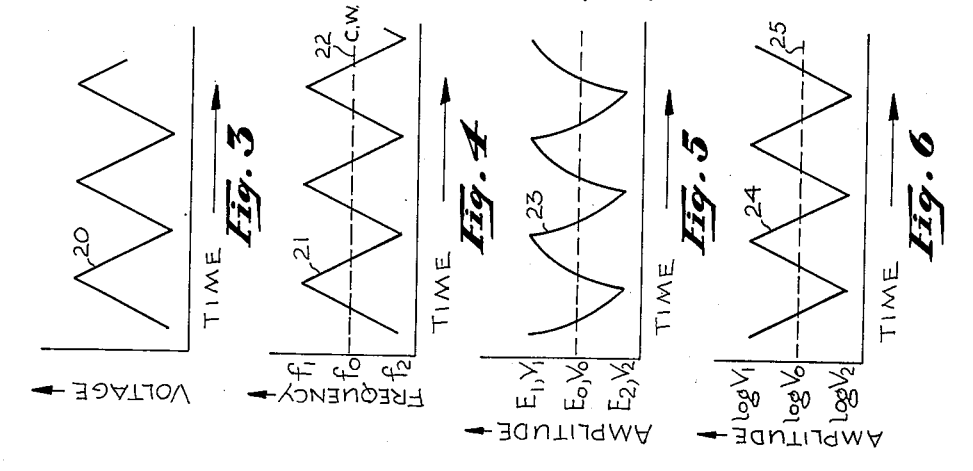
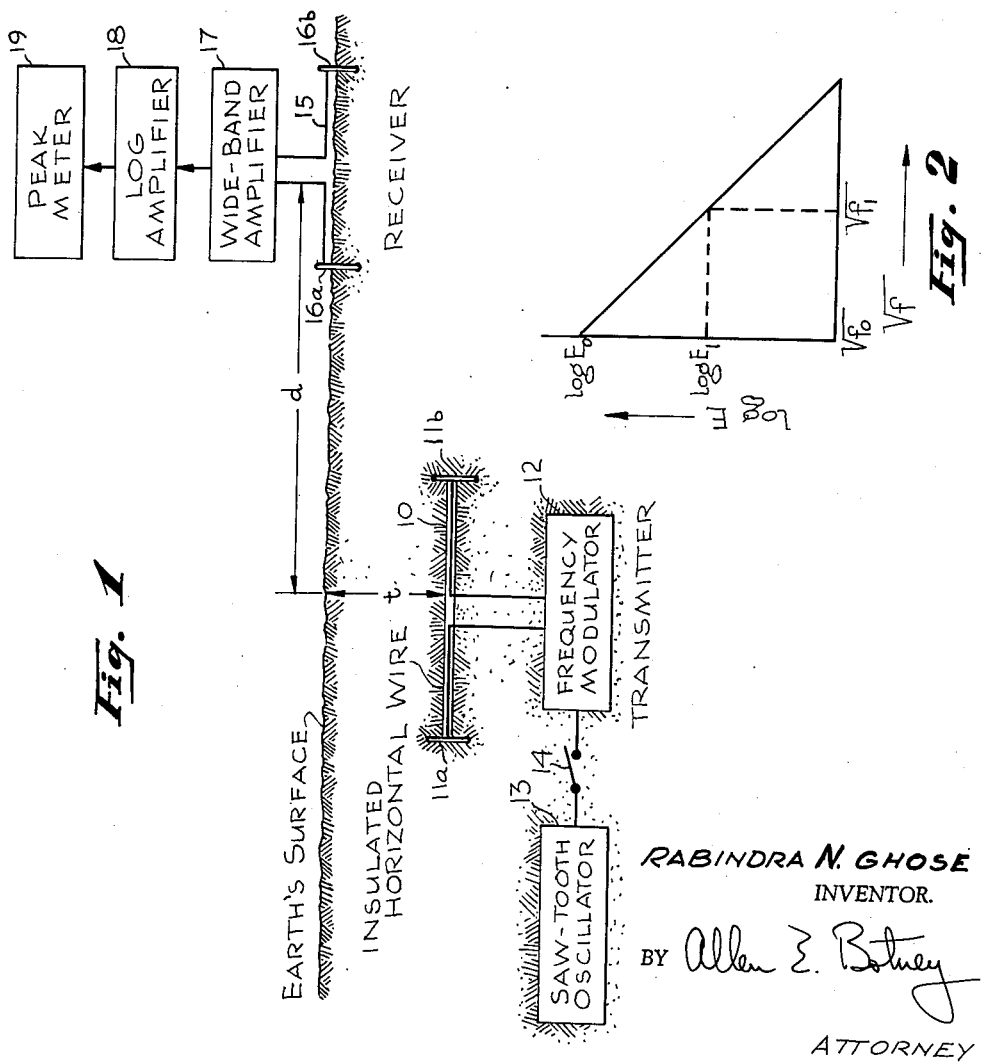
RABINDRA N. GHOSE
INVENTOR.
BY Allen E. Botney
ATTORNEY

United States Patent Office 3,036,265
Patented May 22, 1962

3,036,265
GEOPHYSICAL METHOD AND APPARATUS
Rabindra N. Ghose, Los Angeles, Calif., assignor to Space-General Corporation, Glendale, Calif., a corporation of California
Filed Jan. 19, 1960, Ser. No. 3,369
6 Claims. (Cl. 324—6)

The present invention relates in general to the art of geophysical exploration and more particularly relates to a method and apparatus utilizing frequency-modulation techniques for measuring certain electromagnetic properties of the earth.

The desirability of using the earth as a propagating medium may be found in the fact that subsurface communication systems would, in general, be simpler, more effective, less expensive, and more permanent than existing conventional systems. More specifically, communication systems constructed on the surface of the earth are subject to the disruptive and destructive forces of both nature and man. Thus, it is well known that phenomenae such as sun spots will often disrupt communications for a significant period of time and that tornadoes, heavy snows and other such weather conditions will damage or destroy communication links, such as transmission lines and communication installations. Furthermore, fires and explosions, both of which are encountered in times of war, also produce destructive effects of the types mentioned.

Where the earth is used as a propagating medium as, for example, in connection with subsurface electromagnetic communication systems, knowledge of the electrical characteristics of the earth, such as its conductivity, is essential. Stated differently, where the transmitting and receiving antennas are imbedded several feet or even several hundred feet underground, the electrical characteristics of the earth at the transmitter and receiver sites should be known for proper system design. Specifically, the electromagnetic field and, hence, the signal strength at the receiving station decreases, for such systems, at the rate of $\alpha\sqrt{\sigma}$ db per meter of depth of the transmitter and receiver antennas, $\sigma$ being the conductivity of the earth expressed in mhos per meter and $\alpha$ being equal to $\sqrt{0.3 f_{kc}}$, where $f_{kc}$ is the operating frequency of the system in kilocycles. Those skilled in the art will immediately recognize from what has been said that for an underground antenna installation buried at a considerable depth, a relatively slight error in the assumption of the value of $\sigma$ may put such a communication system out of commission.

It is, therefore, an object of the present invention to provide a method and apparatus for accurately measuring electrical properties of the earth.

It is another object of the present invention to provide a method and apparatus for quickly and accurately measuring the conductivity of the earth at different depths.

In accordance with the basic concept of the present invention, the above-stated objects may be achieved by obtaining the slope of a curve which relates the two independent variables in a mathematical equation, the dependent variable in the equation and also the slope of the curve being the average conductivity for a vertical cross-section of the earth to a predetermined depth. The slope of the curve is found in a practical manner, namely, by obtaining corresponding increments in the ordinate and abscissa values of the curve and then forming a proper ratio between them. In turn, the referred-to increments are obtained by ascertaining two points on the curve, the difference between the ordinate values of the points constituting the ordinate increment and the difference between their abscissa values constituting the abscissa increment. As may be expected, the slope of the curve and, therefore, the average conductivity spoken of above is obtained by dividing the ordinate increment by the abscissa increment.

More specifically, according to one embodiment of the invention, an antenna constituting a linear horizontal current source is placed below the surface of the earth at a depth "$t$" at which communications may be established. From this buried antenna, continuous-wave and frequency-modulated signals are transmitted in succession to another antenna that is preferably located on the earth's surface, the frequency of the frequency-modulated wave preferably undergoing a triangular variation. At the receiver site, the received waves are processed in such a manner that one point on the above-said curve is supplied by the continuous-wave signal and the second point on the curve is provided by the frequency-modulated signal, thereby making the value of conductivity readily available. Basically, the processing involves calibrating a peak reading meter so that it will read zero when the continuous-wave signal is transmitted. As will be seen later from the detailed description of the invention, as a result of the calibration the peak value of the frequency-modulated signal read by the meter indicates the product of the square root of the conductivity and the depth "$t$". It will be recognized that in view of the fact that the depth "$t$" is known in a specific situation, the meter scales may be calibrated to read conductivity directly. In order to insure accurate calibration of the meter, both the positive and the negative peak amplitudes of the triangular-shaped frequency modulated signal are measured and an average taken.

Thus, the method and apparatus of the present invention provides a way for accurately determining the average conductivity of a vertical cross-section of the earth down to a depth "$t$," a quantity that is so essential in the competent design of subsurface communication links. It will also be apparent that the same invention may be used to determine the average conductivity of a column of water where it is desired to establish underwater communications. Moreover, it will be recognized by those skilled in the geophysical arts that the present invention may be utilized to very good advantage in seeking and locating oil, gas and various other kinds of mineral and ore deposits since the slope of the curve and, consequently, the average conductivity will change sharply where such deposits exist.

The novel features which are believed to be characteristic of the invention, both as to its organization and method of operation, together with further objects and advantages thereof, will be better understood from the following description considered in connection with the accompanying drawing in which an embodiment of the invention is illustrated by way of example. It is to be expressly understood, however, that the drawing is for the purpose of illustration and description only and is not intended as a definition of the limits of the invention.

FIGURE 1 is a block diagram representing the method and apparatus of an embodiment of the present invention;

FIGURE 2 is a diagram used herein to explain the method of the present invention;

FIGURES 3 and 4 illustrate the different types of signals developed at different points in the transmitter apparatus of FIGURE 1; and FIGURES 5 and 6 illustrate the different signals developed at different points in the receiver apparatus of FIGURE 2.

Considering now the drawings, reference is made in particular to FIGURE 1 wherein the embodiment shown includes a transmitter antenna 10 positioned at a depth "t" below the surface of the earth. Antenna 10 preferably consists of an insulated horizontal wire whose ends are terminated by a pair of electrodes 11a and 11b driven into the earth. Accordingly, the ends of the antenna are grounded by means of these electrodes. Antenna 10 is coupled to other transmitter apparatus, namely, a frequency-modulator 12 which is interposed between the antenna and a sawtooth generator 13. The generator may be selectively connected to the frequency-modulator by means of a switch 14 connected between the two. In connection with generator 13 and modulator 12, it should be mentioned here that the generator is of the type that generates a triangular-shaped voltage wave and the frequency-modulator is of the type that generates a continuous-wave signal at a frequency $f_0$ when switch 14 is open and the generator is disconnected from it.

The receiver portion of the FIGURE 1 embodiment includes an antenna 15 preferably located at the surface of the earth at a horizontal distance "d" from transmitter antenna 10. Here again, antenna 15 preferably consists of an insulated horizontal wire grounded at its ends by means of a pair of electrodes respectively designated 16a and 16b. The output of antenna 15 is coupled to a wideband amplifier 17 whose response is essentially constant over the range of frequencies of interest, which may extend from direct-current up to thirty or forty kilocycles. The wideband amplifier is connected to a logarithmic amplifier 18 which, in turn, is connected at its output end to a peak-reading meter 19 adapted to selectively read either positive or negative peaks. Logarithmic amplifiers as well as peak-reading instruments are generally known and available and, hence, need not be described further herein.

In considering the operation, it should first be mentioned that a newly derived mathematical equation for ground conductivity underlies the above-described apparatus and the method it encompasses. The equation referred to is:

$$\sigma^{1/2} = -\frac{500}{8.68t} \frac{\partial(20 \log_{10} E)}{\partial(f^{1/2})}$$

where

E is the electric field at relatively short ranges from transmitter antenna 10;
$f$ is frequency in cycles/second;
$t$ is the depth of the transmitter antenna below the earth's surface in meters; and
$\sigma$ is the average ground conductivity of a vertical cross-section of the earth to the depth "t" in mhos/meter.

It should be remarked that for a given range "d" from antenna 10, the frequencies for which the equation is valid is given by $$f \ll \frac{c}{2\pi d}$$

where $c$ is the velocity of light.

The manner in which the equation presented above is derived is as follows:

Assuming a Cartesian coordinate system and a flat earth, let the coordinate system be assumed such that the plane $z=0$ coincides with the earth's surface. Thus, any point whose $z$ coordinate is greater than zero denotes a point in the air above the earth's surface.

Accordingly, from Maxwell's equation one can define a Hertz vector $\bar{\pi}$ such that $$\bar{H} = j\omega\epsilon_1 \nabla \times \bar{\pi} \tag{1}$$

where $\epsilon_1 = \epsilon + \sigma/j\omega$ and a time factor of $e^{j\omega t}$ assumed.

Substitution of Equation 1 into other Maxwell equations yields $$\nabla^2 \bar{\pi} + \beta^2 \bar{\pi} = j\bar{J}_0/\omega\epsilon_1 \tag{2}$$

$$\bar{E} = (\beta^2 + \nabla \nabla \cdot)\bar{\pi} \tag{3}$$

$$\beta^2 = \omega^2 \mu\epsilon - j\omega\mu\sigma \tag{4}$$

For a horizontal current element of length L, carrying a current I and imbedded underground at a depth $t$, $\bar{J}_0$ can be approximated as $$\bar{J}_0 = \bar{u}_x p \delta(x)\delta(y)\delta(Z+t) \tag{5}$$

where $\bar{u}_x$ is the unit vector in the $x$ direction;
$\delta(x)$ is the Dirac delta function of $x$; and
$p = \lim \infty \, (IL)$
$\quad L \to 0$
$\quad I \to \infty$ From Equations 2, 3, 4 and 5 one obtains the inhomogeneous equation $$(\nabla^2 + \beta^2)\bar{\pi} = j\frac{p}{\omega\epsilon_1}\bar{u}_x \delta(x)\delta(y)\delta(z+t) \tag{6}$$

If the Hertz vector below and above the earth's surface be represented by $$\bar{\pi} = \bar{u}_x \pi_{x1} + \bar{u}_z \pi_{z1}, Z \leq 0 \tag{7}$$

$$\bar{\pi} = \bar{u}_x \pi_{x2} + \bar{u}_z \pi_{z2}, Z \geq 0 \tag{8}$$

then the boundary conditions involving the continuity of the $\bar{H}$ and $\bar{E}$ fields at the interface $z=0$ require that $$\beta_1^2 \pi_{x1} = \beta_2^2 \pi_{x2} \tag{9}$$

$$\beta_1^2 \pi_{z1} = \beta_2^2 \pi_{z2} \tag{10}$$

$$\beta_1^2 \frac{\partial \pi_{x1}}{\partial z} = \beta_2^2 \frac{\partial \pi_{x2}}{\partial z} \tag{11}$$

$$\frac{\partial \pi_{x1}}{\partial x} + \frac{\partial \pi_{z1}}{\partial z} = \frac{\partial \pi_{x1}}{\partial x} + \frac{\partial \pi_{z2}}{\partial z} \tag{12}$$

The solution of the differential equations involving $\pi_{x1}, \pi_{x2}, \pi_{z1}$ and $\pi_{z2}$, subject to the boundary conditions given by Equations 9, 10, 11 and 12 can be expressed as $$\pi_{x1} = -\frac{jp\eta_1}{4\pi\beta_1}\int_0^\infty \left[\frac{1}{\gamma_1}e^{-\gamma_1|z+t|} - \frac{1}{\gamma_1}e^{\gamma_1(z-t)} + \frac{2}{\gamma_1+\gamma_2}e^{\gamma_1(z-t)}\right] J_0(hd) h \, dh \tag{13}$$

$$\pi_{x2} = -\frac{jp\eta_2}{4\pi\beta_2}\int_0^\infty \frac{2}{\gamma_1+\gamma_2} e^{-\gamma_2 z - \gamma_1 t} J_0(hd) h \, dh \tag{14}$$

$$\pi_{z1} = \frac{jp\eta_1 \cos\phi}{4\pi\beta_1} \frac{\partial}{\partial\rho}\int_0^\infty \frac{2(\gamma_1-\gamma_2)}{\beta_2^2\gamma_1+\beta_1^2\gamma_2} e^{\gamma_1(z-t)} J_0(hd) h \, dh \tag{15}$$

$$\pi_{z2} = \frac{jp\eta_2 \cos\phi}{4\pi\beta_2} \frac{\partial}{\partial\rho}\int_0^\infty \frac{2(\gamma_1-\gamma_2)}{\beta_2^2\gamma_1+\beta_1^2\gamma_2} e^{-\gamma_2 z - \gamma_1 t} J_0(hd) h \, dh \tag{16}$$

where $\eta_1 = \sqrt{\frac{\mu}{\epsilon_1}} \sim \sqrt{\frac{j\omega\mu_0}{\sigma}}\left(1 - j\frac{\omega}{2\sigma}\right);$ $\eta_2 = 120\pi;$ $\beta_2 = \frac{2\pi}{\lambda};$ $\gamma_1^2 = h^2 - \beta_1^2;$ $\gamma_2^2 = h^2 - \beta_2^2;$ $d^2 = x^2 + y^2$ $\lambda$ = free space wavelength; and
$\phi$ is defined such that $\phi=0$ represents a vertical plane passing through the horizontal wire or antenna shown in the drawing.

When $|\beta_1/\beta_2|^2 \ll 1$, $\rho \gg \delta = \dfrac{500}{\sqrt{\sigma f}} =$ skin depth, $l \ll \lambda$, and the horizontal wire is very close to the surface of the earth, then $$E_x = \frac{p}{2\pi\sigma} e^{-j\beta_1 t} \left\{ \frac{1}{d} \frac{\partial}{\partial d}\left(\frac{e^{-j\beta_2 d}}{d}\right) + \cos^2\phi \frac{\partial^2}{\partial d^2}\left(\frac{e^{-j\beta_2 d}}{d}\right) \right\} \quad (17)$$

$$E_y = \frac{p}{2\pi\sigma} e^{-j\beta_1 t} \left\{ \sin\phi \cos\phi \frac{\partial^2}{\partial d^2}\left(\frac{e^{-j\beta_2 d}}{d}\right) \right\} \quad (18)$$

Since $$\beta_1 = \sqrt{\frac{\omega\mu\sigma}{2}}(1-j) = \frac{1}{\delta}(1-j)$$

the maximum value of $E_x$ (corresponding to $\phi=0$) becomes $$|E_x|_{max} = \frac{p e^{-t/\delta}}{2\pi\sigma d^3}[1 + j\beta_2 d - \beta_2^2 d^2] \quad (19)$$

For short ranges $\beta_2 d \ll 1$; hence $$|E_x|_{max.} = \frac{p}{2\pi\sigma d^3} e^{-t/\delta} \quad (20)$$

$$= \frac{Il}{2\pi\sigma d^3} e^{-\frac{t}{500}\sqrt{\sigma}\sqrt{f}} \quad (20a)$$

In terms of decibels, $$|E_x|_{max.} = 20 \log\left(\frac{Il}{2\pi\sigma d^3}\right) - \frac{8.68 t\sqrt{\sigma}\sqrt{f}}{500} \quad (21)$$

Therefore, $$\frac{\partial |E_x|_{max.} \text{ in decibels}}{\partial \sqrt{f}} = -\frac{8.68 t\sqrt{\sigma}}{500} \quad (22)$$

Solving Equation 22 for $\sqrt{\sigma}$, we have $$\sqrt{\sigma} = -\frac{500}{8.68 t}\left[\frac{\partial |E_x|_{max.} \text{ in db.}}{\partial \sqrt{f}}\right] \frac{\text{mho}}{\text{meter}} \quad (23)$$

which is the equation it was intended to derive.

It will be noted from Equation 23 that since $t$ is fixed once the transmitter apparatus is positioned at some depth below the surface of the earth, the average conductivity of the earth to that depth $t$ is a function of the slope of the curve obtained by plotting E in decibels against the square root of frequency. From experience it is known that such a curve is substantially a straight line so that the line as well as the slope of the line may be defined by obtaining two points on the line, as is clearly illustrated in FIGURE 2 by way of example. As shown therein, the coordinates of the two points are $(\sqrt{f_0}, \log E_0)$ and $(\sqrt{f_1}, \log E_1)$, the slope of the line defined by these points therefore being $$\frac{\log E_0 - \log E_1}{\sqrt{f_0} - \sqrt{f_1}}$$

This is the same as the expression in Equation 23, namely, $$\frac{\partial |E| \text{ in decibels}}{\partial \sqrt{f}}$$

The method and apparatus of the present invention are concerned with obtaining the values of two such points with the aid of which the average conductivity of a cross-section of the earth to a predetermined depth $t$ may be determined.

Accordingly, with switch 14 in FIGURE 1 open, frequency modulator 12 generates a continuous-wave signal at a frequency $f_0$, as shown by broken line 22 in FIGURE 4. This signal is passed on to antenna 10 from which the signal is radiated through the earth to antenna 15 at the surface. In being radiated through the earth, the signal is attenuated according to the square root of its frequency, as will be noted from the Equations 20a and 21. Thus, the amplitude of the signal received by antenna 15 is related to the square root of the signal frequency $f_0$.

At antenna 15, the continuous-wave signal thusly received is first amplified by wide-band amplifier 17 and then applied to log amplifier 1 which takes the logarithm of the signal produced by the wide-band amplifier. Consequently, the signal out of log amplifier 18 may be used as one of the two points desired since it has coordinates corresponding to values ($\log V_0$, $\sqrt{f_0}$). This signal out of the log amplifier is applied to peak meter 19, the gain of wide-band amplifier 17 or the peak meter itself being adjusted so that the meter will read zero in response to it.

By so doing, the meter scale may be calibrated to provide a direct reading of slope and, therefore, of conductivity, for reasons that will appear below.

Once adjustment is made so that peak meter 19 reads zero in response to the continuous-wave signal, switch 14 is closed and the triangular-shaped voltage generated by oscillator 13 is applied to frequency modulator 12. This triangular-shaped voltage is illustrated in FIGURE 3 and is designated 20 therein. As a result, the signal produced by apparatus 12 is frequency modulated, the signal therefrom being of constant amplitude but varying linearly in frequency between frequency limits $f_1$ and $f_2$ with frequency $f_0$ being substantially midway therebetween. The manner in which the signal frequency varies is shown by curve 21 in FIGURE 4 and, as shown, the frequency varies linearly between $f_1$ and $f_2$, frequency $f_0$, the frequency of the continuous wave signal, being substantially equal to $$\frac{f_1 + f_2}{2}$$

Thus, frequencies $f_1$ and $f_2$ correspond to the peaks in curve 21.

The frequency-modulated signal out of modulator 12 is applied to antenna 10 by means of which the signal is then radiated through the earth to antenna 15 at the surface. Whereas the frequency-modulated signal radiated from antenna 10 was of constant amplitude, it will be noted from curve 23 in FIGURE 5 that the amplitude of the frequency-modulated signal received by antenna 15 varies exponentially. This is due to the propagational characteristics of the earth as a result of which the different frequency components of the frequency-modulated signal are differently attenuated, thereby producing a frequency-modulated signal of varying amplitude. More particularly, attenuation occurs as a function of the square root of frequency as may readily be seen from Equation 20a above and from which it will be ascertained that the amplitude of the signal received by antenna 15 decreases exponentially in going from frequency $f_1$ to frequency $f_2$ and increases exponentially in going from frequency $f_2$ to frequency $f_1$. Stated differently, curve 23 is in essence a repetitive or periodic plot of the amplitude of the received signal against the square root of frequency, the peaks of curve 23 occurring at $\sqrt{f_1}$ and $\sqrt{f_2}$.

The signal received by antenna 15 is applied to wide-band amplifier 17 wherein the signal is amplified. However, since the gain of amplifier 17 is substantially constant over a wide range of frequencies, the amplitude of the signal still varies in the manner heretofore described, and this fact is also illustrated by curve 23.

From amplifier 17, the signal is applied to log amplifier 18 which, as previously mentioned, produces an output signal whose amplitude is the logarithm of the amplitude of the input signal. Consequently, since the amplitude of the signal applied to the log amplifier varies exponentially, the amplitude of the output signal varies linearly, as is illustrated by curve 24 in FIGURE 6 and as will be recognized by those skilled in the art. Furthermore, it will also be recognized that since curve 23 is essentially a periodic plot of amplitude versus the square root of frequency, curve 24 is a periodic plot of the logarithm of amplitude versus the square root of frequency. Thus, the magnitude of the slope of curve 24 is the quantity it is desired to find and, for the reasons previously explained, this can be done by finding two points on the curve. One point has already been found, namely, the point made available by the continuous-wave signal at frequency $f_0$. This first point corresponds to the point of intersection between broken line 25 and curve 24 in FIGURE 6. It will also be remembered that an adjustment was made such that this first point produced a zero reading by peak meter 19.

The second point needed may be obtained by taking a peak reading of the frequency-modulated signal represented by curve 24. More specifically, the signal out of log amplifier 18 is applied to peak meter 19 which provides a reading corresponding to a positive peak in curve 24, that is, the peak meter reads log $V_1$ which corresponds to $\sqrt{f_1}$. In other words, in response to the output from log amplifier 18, peak meter 19 indicates a second point whose coordinates are ($\sqrt{f_1}$, log $V_1$). Hence, two points on curve 24 are now known so that the slope of the curve, namely, $$\frac{\log V_1 - \log V_0}{\sqrt{f_1} - \sqrt{f_0}}$$

and the conductivity of the earth, can be determined. Furthermore, since the point ($\sqrt{f_0}$, log $V_0$) was calibrated to zero on the peak meter scale, it will be obvious that the peak reading of the meter corresponding to the second point provides the slope of the curve itself. In other words, when log $V_1$ is read, the meter scale is actually reading slope so that the scale can be and is calibrated to provide a direct reading of conductivity.

In order to insure accuracy, both the positive and negative peak amplitudes of curve 24 should be measured. The average ground conductivity is then determined by taking an average of the positive and negative peak amplitudes, which amounts to taking an average of the positive and negative slopes of curve 24.

Having thus described the invention, what is claimed as new is:

1. Geophysical apparatus for obtaining the average value of conductivity of a vertical cross-section of the earth to a depth "$t$," said apparatus comprising: means for selectively generating a frequency-modulated signal whose frequency variation is triangular between frequency limits $f_1$ and $f_2$ and a continuous-wave signal whose frequency $f_0$ is substantially midway between frequencies $f_1$ and $f_2$; a first antenna for radiating said continuous-wave and frequency-modulated signals through the earth, said antenna being positioned at the depth "$t$" beneath the surface of the earth and insulated therefrom, the ends of said antenna being shorted to ground; a second antenna coupled to the earth at the surface thereof for intercepting the continuous-wave and frequency-modulated signals propagated therethrough, the propagational characteristics of the earth being such that the amplitude of the signal induced in said second antenna in response to the frequency-modulated signal decreases substantially exponentially with increasing frequency and increases substantially exponentially with decreasing frequency; means coupled to said second antenna for linearizing the amplitude variations of said induced frequency-modulated signal to produce a corresponding signal whose amplitude varies triangularly; and an output device coupled to said last-named means, said device being adapted to respond to the continuous-wave and frequency-modulated signals therefrom to provide the slope of the amplitude of said corresponding signal, said slope being correlated to the value of conductivity to be measured.

2. In a system for obtaining the average value of conductivity of a vertical cross-section of the earth, transmitter apparatus comprising: first means for generating a triangular-shaped voltage wave; second means normally generating a continuous-wave signal at frequency $f_0$, said second means being coupled to said first means and operable in response to the triangular-shaped wave therefrom to generate a frequency-modulated signal whose frequency varies triangularly between frequency limits $f_1$ and $f_2$, frequency $f_0$ being substantially midway between frequencies $f_1$ and $f_2$ and an antenna adapted to radiate said signals from a point below the surface of the earth, said antenna including an insulated wire electrically connected at its ends to electrodes for shorting the ends of the wire to ground.

3. In a system wherein continuous-wave and frequency-modulated signals are transmitted through the earth to the surface to obtain the average value of conductivity for a vertical cross-section thereof, the frequency of the frequency-modulated signal varying triangularly between frequency limits $f_1$ and $f_2$ and the frequency $f_0$ of the continuous-wave signal being substantially midway between frequencies $f_1$ and $_2$, receiver apparatus comprising: an antenna adapted to be coupled to the earth to intercept the continuous-wave and frequency-modulated signals propagated therethrough, the propagational characteristics of the earth being such that the amplitude of the frequency modulated signal induced in said antenna in response to the transmitted frequency-modulated signal decreases substantially exponentially with increasing frequency and increases substantially exponentially with decreasing frequency; means coupled to said antenna for linearizing the amplitude variations of said induced frequency-modulated signal to produce a corresponding signal whose amplitude varies triangularly; and an output device coupled to said means and adapted to respond to the continuous-wave and frequency-modulated signals therefrom to provide the slope of the amplitude of said corresponding signal, said slope being correlated to the value of conductivity to be measured.

4. Geophysical apparatus for obtaining the average value of conductivity of a vertical cross-section of the earth to a depth "$t$," said apparatus comprising: means for generating a triangular-shaped voltage wave; a frequency modulator selectively coupled to said means, said modulator normally generating a continuous-wave signal at frequency $f_0$ and operable in response to said triangular-shaped voltage wave to generate a frequency-modulated signal whose frequency varies triangularly between frequency limits $f_1$ and $f_2$, frequency $f_0$ being substantially midway between frequencies $f_1$ and $f_2$; a first antenna positioned at the depth "$t$" beneath the surface of the earth for radiating said continuous-wave and frequency-modulated signals through the earth to the surface thereof, said first antenna including a horizontal insulated wire coupled to said frequency modulator and a pair of electrodes respectively connected to the ends of said wire and driven into the earth for shorting said wire ends to ground; a second antenna coupled to the earth at the surface thereof for intercepting the continuous-wave and frequency-modulated signals propagated therethrough, the propagational characteristics of the earth being such that the amplitude of the signal induced in said second antenna in response to the frequency-modulated signal decreases substantially exponentially with increasing frequency and increases substantially exponentially with decreasing frequency; a logarithmic amplifier coupled to said second antenna for substantially linearizing the amplitude variations of said induced frequency-modulated signal to produce a corresponding frequency-modulated signal whose amplitude varies triangularly; and a peak-reading meter coupled to said amplifier for receiving said continuous wave and corresponding frequency-modulated signals, said meter being adapted to respond to said signals to provide the slope of the linearly-varying amplitude of said corresponding frequency-modulated signal, said slope being mathematically related to the sought after value of conductivity.

5. Geophysical apparatus for obtaining the average value of conductivity of a vertical cross-section of the earth to a depth "$t$," said apparatus comprising: first means mounted in the earth at depth "$t$" and electrically coupled thereto for selectively radiating through the earth to a receiver site a continuous-wave signal and a frequency-modulated signal of constant amplitude whose frequency varies triangularly with time between two frequencies; second means at the receiver site receptive of said radiated continuous-wave and frequency-modulated signals, said second means being operable in response to said frequency-modulated signal of constant amplitude to produce a corresponding frequency-modulated signal whose amplitude varies triangularly between said two frequencies, said second means including additional means operable in response to said continuous wave and corresponding frequency-modulated signals to provide the slope of the linearly varying amplitude of said corresponding signal, said slope corresponding to the value of conductivity it is desired to measure.

6. In a system wherein continuous-wave and frequency-modulated signals are transmitted through the earth to the surface to obtain the average value of conductivity for a vertical cross-section thereof, the frequency of the frequency-modulated signal varying triangularly between frequency limits $f_1$ and $f_2$ and the frequency $f_0$ of the continuous-wave signal being substantially midway between frequencies $f_1$ and $f_2$, receiver apparatus comprising: an antenna coupled to the earth at the surface thereof for intercepting the continuous-wave and frequency-modulated signals propagated therethrough, the propagational characteristics of the earth being such that the amplitude of the signal induced in said antenna in response to the frequency-modulated signal decreases substantially exponentially with increasing frequency and increases substantially exponentially with decreasing frequency; a logarithmic amplifier coupled to said antenna for substantially linearizing the amplitude variations of said induced frequency-modulated signal to produce a corresponding frequency-modulated signal whose amplitude varies triangularly; and a peak-reading meter coupled to said amplifier for receiving siad continuous-wave and corresponding frequency-modulated signals, said meter being adapted to respond to said signals to provide the slope of the linearly-varying amplitude of said corresponding frequency-modulated signal, said slope being mathematically related to the sought after value of conductivity.

References Cited in the file of this patent
UNITED STATES PATENTS

| 1,530,129 | Loftin et al. | Mar. 17, 1925 |
| 1,652,227 | Zuschlag | Dec. 13, 1927 |
| 1,864,024 | Lowy | June 21, 1932 |
| 2,659,882 | Barret | Nov. 17, 1953 |